Dec. 7, 1965

G. D. BRUCE ETAL 3,222,658

MATRIX SWITCHING SYSTEM

Filed Aug. 27, 1962

INVENTORS
GEORGE D. BRUCE
WILLIAM R. WOHLFORT
BY Carl C. Kling
ATTORNEY

United States Patent Office 3,222,658

Patented Dec. 7, 1965

3,222,658

MATRIX SWITCHING SYSTEM

George D. Bruce, West Lafayette, Ind., and William R. Wohlfort, Hopewell Junction, N.Y., assignors to International Business Machines Corporation, New York, N.Y., a corporation of New York Filed Aug. 27, 1962, Ser. No. 220,353

6 Claims. (Cl. 340—174)

This invention relates to a magnetic memory system, and more particularly to a magnetic core memory accessed by a complex of current-steering diodes and matrix switches, including separate matrix switch windings for read drive, write drive, read gate and write gate.

Utilization of load-sharing matrix switches to provide operating currents to magnetic core storage arrays has become widespread. In the prior art, the usual mode of operation specifies a read-write sequence involving bipolar switching of each individual core of a read-write matrix switch to provide the appropriate direction of current for reading and then for writing. Each matrix switch core switches from the read to the write direction and back each cycle; the read operation sets the individual core for the write operation and conversely. Word selection is by read-write matrix switch as one coordinate and gate as the other coordinate. The gate is generally a transistor switch, closely connected with the matrix switch. Matrix switches used for both driver and gate complete addressing by matrix switches has not been the practice.

CHARACTERISTICS OF THE INVENTION

*Objects*

The object of the invention is to provide appropriate operating currents to a storage array for high speed operation, using matrix switches for both read selection, write selection and gate selection.

More specifically, the object of the invention is to provide reading and writing currents to a magnetic core storage array in a time and sequence relationship most advantageous to normal operating demands, by using separate oppositely polarized matrix switch core read and write windings.

*Features*

A feature of the invention is the provision of separate matrix switch core windings for read drive and write drive, and separate matrix switch core windings for read gate and write gate, all for selecting a particular word of storage cores.

A second feature of the invention is the use of the storage array capacitance built up during the read operation of a read-write cycle as an affirmative filtering agent during the ensuing write operation.

Another feature is the pump, which services the entire matrix each cycle after the write operation to discharge the array capacitance to the desired level for reading.

Another feature is the placement of a clamp diode on the secondary of the gate matrix switch core to allow the matrix switch to act as a voltage source rather than as a current source.

Another feature is the placement of a dummy load across separate read drive and write drive matrix switch cores for flux reversal during reset.

*Advantages*

A two-wire magnetic core matrix can be accessed economically and at appropriate speeds by two-coordinate matrix switch selection. A three-wire magnetic core matrix can be accessed similarly.

The array capacitance (normally a handicap) is used to advantage, allowing for load variations between read and write when properly serviced by the pump.

The foregoing and other objects, features and advantages of the invention will be apparent from the following more particular description of preferred embodiments of the invention, as illustrated in the accompanying drawings.

*Drawings*

*General operation of magnetic storage array*

Figure 1:
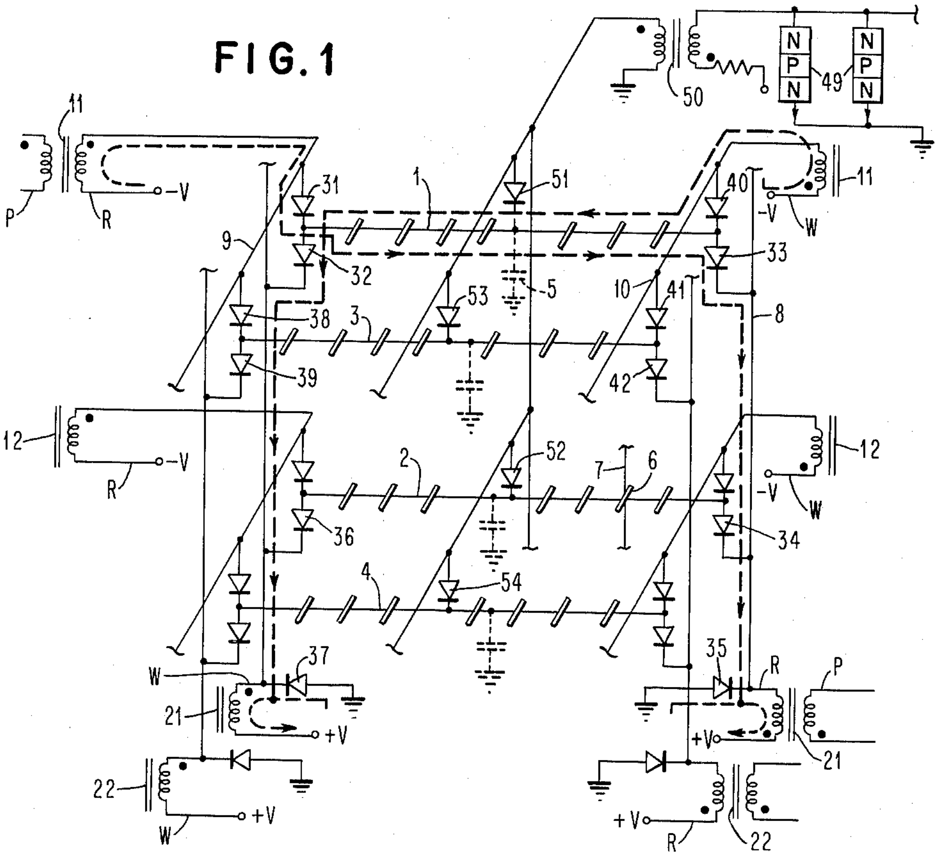
FIGURE 1 is a demonstrative schematic diagram of a magnetic core storage array, a first embodiment of the invention, having a common read-write conductor.

The magnetic core storage array of the preferred embodiments is formed of rows and columns of individual magnetic core storage elements, each capable of assuming two distinct states of remanence which are designated 1 and 0. Storage is effected by setting a core to the desired remanence state, for example 1, by a combination of a write current (more particularly the magnetic field produced by the write current) and a select current. To read the core, the core is driven toward the 0 state by a read current—if there is a change of state (1 to 0) the change of magnetic flux induces a current which can be externally sensed, thus providing 1 output. If there is no change of state (0 to 0), there is no appreciable flux change and no current to sense; this absence of output at the appropriate time for output is recognized as the 0 value.

SUMMARY OF THE INVENTION

The invention relates to two-coordinate word selection in a magnetic core storage array. Accessing of a storage word is by appropriate read or write drive currents through the cores (along word conductor 1 for example). The direction of current is controlled by the choice of read or write drive windings (R of core 11 to read word 1 and W of core 11 to write word 1). The particular word is selected by choice of read or write drive matrix switch core such as 11 for word conductor 1 and read or write gate matrix switch core such as 21 for word conductor 1.

Gate matrix switch 21 acts as a low impedance voltage device rather than as a current device, and thus serves the gating function when coordinated with a pulse from a read matrix switch core 11 winding R.

Clamp diode 35 is essential to this low impedance operation; it establishes an original circuit for the gate current which allows the drive pulse to pass.

Stray capacitance 5 of the word conductor (such as 1)

is used maintain the gate voltage constant during the changeover from read gate to write gate. Pump 49–50 acts after the write portion of each cycle to discharge the word conductor capacitance.

DESCRIPTION OF THE INVENTION—FIGURE 1

Only a representative few of the multitude of storage cores are shown, strung on word conductors 1–4. Word conductors 1 and 2 are in one plane; word conductors 3 and 4 are in another. Each word conductor has a measurable amount of stray capacitance (as indicated by the dotted capacitor 5) which is in the order of 20 picofarads. Each core, such as core 6, also has at least one additional winding such as winding 7 for performing the bit select and sense functions.

A single read-write conductor (such as row word conductor 1) selects a word (all the cores through which it passes may be a word) when the row conductor itself is selected by a combination of driver matrix switch, gate matrix switch and diode selection matrix. Normally, the gate buses are maintained at positive potential +V and the read and write buses at negative potential −V so that the diodes are back-biased and nonconducting.

When a word is selected the appropriate gate bus (such as 8) is switched to ground potential, which reduces the reverse-bias voltage on the diodes to minimum value. When a pair of read and write buses (such as 9 and 10) are selected and successively driven positive, the diodes of the word located at the intersection of the active word drive and gate buses will be forward-biased and conduct current.

Each individual core in each matrix switch has a primary winding and two secondary windings. Core 11 serves as the read-write core for word conductors 1 and 3; core 21 serves as the gate core for word conductors 1 and 2. Driver matrix switch core 11 selects one dimension in which word 1 lies; gate matrix switch core 21 selects the other dimension in which word 1 lies. Cores 11 and 21 together select word 1.

*Read*

FIGURE 1 shows by a dash-line the path of the read pulse for word 1. At top left, core 11 is pulsed by the sum of all the primary currents in usual load-sharing matrix fashion. Assuming read polarity, a positive pulse passes through diode 31, ignoring diode 32 for reasons to be pointed out infra, traverses word conductor 1, passes through diode 33, flows past back-biased diode 34 and clamp diode 35, through the read secondary R of gate matrix switch core 21 to +V. Core 21 is selected in load-sharing matrix switch fashion so that it provides a low impedance path for the read current pulse. This provides full read current to word conductor 1, to switch all the realted cores to state 0 and thus provide sense outputs for all cores which change state as a result; that is, for all cores which were storing 1's.

There is no dilution of the read pulse through diode 32, since the path it controls is dead-ended by back-biased diode 36 and clamp diode 37 and the high impedance of the write secondary of selected gate matrix switch core 21.

There is no dilution of the read pulse via diodes 38 and 39, since the paths they control are all dead-ended by unselected matrix switch core secondary windings and back-biased diodes.

*Write*

FIGURE 1 shows by a dash-line the selection path of the write pulse for word 1. Starting at the top right corner of the figure, the write pulse develops in the write secondary winding of core 11. The primary of core 11 is shown at top left. The read secondary R and write secondary W are oppositely polarized. The write pulse developed in the write secondary passes through diode 40, along word conductor 1 in the write direction, through diode 32 and past back-biased diode 36, clamp diode 37 through write secondary of gate core 21 to +V. The primary of gate core 21 is shown at lower right in FIGURE 1. The read and write secondaries of core 21 are oppositely polarized.

There is no dilution of the write pulse via diodes 33, 41 and 42 since the paths which these diodes control all terminate in back-biased diodes or unselected matrix switch core secondary windings.

Selection of other word conductors is by other combinations of driver matrix switch cores and gate matrix switch cores. To select word 2, for example, it is necessary to choose driver core 12 and gate core 21; to select word 3, driver core 11 and gate core 22.

*Capacitance*

There is capacitance associated with each of the word lines and with the other elements of the array. During the read plus interval of time, the array capacitance, shown by the dotted capacitors attached to each of the word conductors, is charged to a voltage approximately +V.

There are two distinct advantages of the high array capacitance.

(1) If the read drive should come on, unaccompanied by the gate signal, the read drive current is dissipated in the array capacitance and cannot "read" any cores. With no gate at all, the word conductor is held to less than half +V.

(2) Timing and flux problems are minimized. For example, if the gate switch core should run out of flux during write time, the array voltage cannot change much even though write word drive current has not ended. This provides an inherent timing tolerance.

Each matrix switch core has separate read and write secondary windings (such as windings R and W for core 11) with opposite polarities; the read and write windings provide flux balance for each other. This flux balance is necessary so that the core is kept in a state of readiness to change states and thus to provide the read and write pulses. There would be no change of state, for example, if read followed read in the same core, without some mechanism to reset the core.

Figures 2, 3, 4:
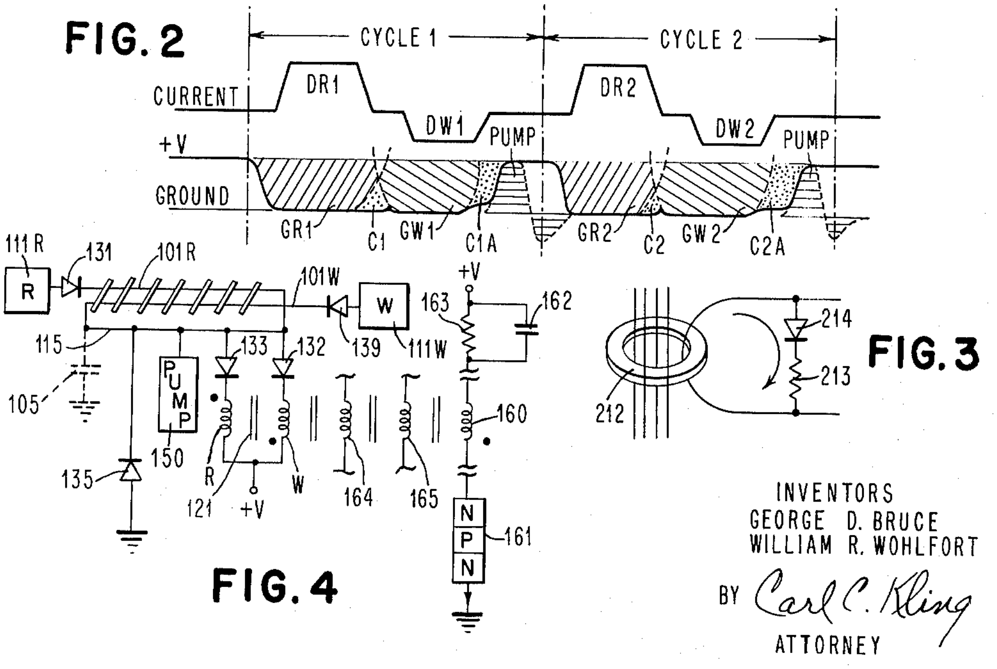
FIGURE 2 is a timing diagram illustrating operating sequence and time relationship.
FIGURE 3 is a demonstrative schematic diagram of a second embodiment of the invention, in which the array has separate read and write row conductors.

FIGURE 2 shows the timing of the various events of a pair of operation cycles. In each cycle, read precedes write. In coincidence, to provide the double selection required, read driver and gate driver operate as shown. The read gate pulse slightly precedes the read pulse; the write gate pulse precedes the write pulse. The pulses are labeled DR (read drive pulse); DW (write drive pulse); GR (read gate pulse); and GW (write gate pulse). Note that the gate pulses GR and GW are separate and distinct; they are provided by different windings and provide low impedance paths for oppositely polarized drive currents. Their common parameter is ground potential.

Array capacitance C1 acts as a filter during the interval between the first read gate GR1 and write gate GW1, making the two gate conditions for all purposes a single ground potential. Write pulse DW1 can thus occur as read pulse DR1 terminates without a wait for the gate pulse to peak.

Additional capacitance may be added if required. Array capacitance C1A which remains at the end of the write interval, however, is deleterious if it is desired to change gate selection. This capacitance is removed by the pump.

*Pump*

To discharge the array capacitance at the end of the write portion of the cycle, pump transistors 49 are conditioned to provide a short, high current pulse through transformer 50 and via diodes 51–54, discharging all the array capacitance.

The next cycle can proceed normally. Read current pulse DR2 is applied coincidently with read gate pulse GR2. Array capacitance C2 holds the gate signal relatively constant at ground potential until the next gate pulse GW2 takes over. At the end of the cycle, remaining array capacitance C2A is discharged by the pump.

*Clamp diodes*

In operation, gate selection precedes read and write driver selection. Gate matrix switch core 21 secondary winding begins conduction through clamp diode 35 as soon as its primary winding is selected and the array capacity is discharged. Clamp diode 35 makes a definite voltage connection to ground as well as providing the original current path for gate matrix switch core 21.

Clamp diode 35 remains forward biased throughout the read operation, providing a low impedance which minimizes gate voltage swings. Clamp diode 37 provides a similar low impedance during the write operation. There is such a clamp diode associated with each secondary winding of each of the gate matrix switch cores. This clamp diode provides an initial current source for the secondary winding. As the read or write word drive pulse appears, a constant current through the secondary is maintained by replacement of a major portion of the current through the clamp diode by the word drive pulse. Enough current is drawn through the clamp diode, however, to maintain it conducting in the low impedance state.

SEPARATE READ AND WRITE WORD CONDUCTORS—FIGURE 3

A second embodiment has separate word conductors 101R for read and 101W for write. Reference characters indicate similarity with FIGURE 1. The word conductors pass from read and write drivers 111R and 111W via selection diodes 131 and 139 respectively to gate bus 115. In the selected gate, a secondary winding such as GR on core 121 is in the low impedance state, providing a path via read gate selection diode 133, through the core to terminal +V.

During the write half of the cycle, secondary W and diode 132 pass the write current to terminal +V.

Throughout both the read and write portions of the cycle, clamp diode 135 remains forward biased to provide the low impedance.

Selection of core 121 is by standard matrix switch techniques. Transistor 161 is representative of the several load-sharing power transistors. It, when properly conditioned by addressing mechanism, provides a constant current pulse through primary winding 160 and RC overdrive network 162–163. Primary winding 164 and 165 are representative of the other primary drives.

SEPARATE CORES FOR READ AND WRITE—FIGURE 4

To allow closer spacing of the read and write intervals, it may be advantageous to use completely separate matrix switches for read and write drive. This guarantees switch core flux control under the varying load conditions that can exist between read and write.

Limiting cases for load variations in a word are reading all 1's, followed by writing all 0's and reading all 0's followed by writing all 1's.

During read time the read core (such as 212) is set and delivers current to the read bus. During write time the read core is reset and delivers current to dummy load resistance 213. Diode 214 permits current to pass through the dummy load reset but not when the word is being driven.

The write core is set during write time and reset during the next cycle at read time.

The amplitude of the read and write current will be proportional to the primary winding currents and is determined by the number of secondary turns on each core.

*Final summary*

The invention provides two-coordinate word selection in a magnetic core array. Read and write matrix switch core secondary windings provide via a diode current-steering matrix the appropriate current to select and operate a chosen word in each of several planes. The particular word chosen is selected by a gate matrix switch core arranged to operate as a selective low impedance device.

The gate matrix switch core acts as a low impedance by virtue of a clamp diode which establishes an original gate circuit. The word drive current partially replaces the current in the original gate circuit.

Stray capacitance inherent in the word conductors is used to maintain ground potential on the gate bus during the changeover from read gate to write gate, allowing fast action. As the write gate pulse terminates, a pump discharges the word conductor capacitance.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A magnetic core storage system comprising:

(a) a multiplicity of magnetic elements arranged in a matrix of rows and columns, each row defining a word and each column defining a bit position within the word;

(b) a plurality of word conductor means each relating a row of cores together as a word, said word conductor means having a finite inherent capacitance;

(c) column conductor means relating, within each of the several affected words, each magnetic element to a particular bit position for setting and for sensing;

(d) read word selection means, including read drive matrix switch-diode matrix mechanism for read driving and a matrix switch-diode matrix mechanism for read gating, connected to said plurality of word conductor means and arranged to provide for a selected word conductor means the read select current required for read operation;

(e) write word selection means, including write drive matrix switch-diode matrix mechanism for write driving and a write gate matrix switch-diode matrix mechanism for write gating, connected to said plurality of word conductor means and arranged to provide for a selected word conductor means the write select current required for the write operation;

(f) pump means connected to each of said word conductor means to discharge the inherent capacitance; and (g) cycle control means arranged to provide a cycle of read-write-pump; whereby the charging of the capacitance during the read interval acts as a filter to extend gating from the read interval into the write interval, but the action of the pump prevents the capacitance from acting as a filter to extend gating from the write interval into the succeeding read interval.

2. A magnetic core storage system according to claim 1, wherein read word selection means (d) and said write word selections means (e) include separate, oppositely polarized, read and write secondaries on individual matrix switch cores of the read drive matrix and write drive matrix switch.

3. A magnetic core storage system according to claim 1, wherein read word selection means (d) and said write word selection means (e) include separate read matrix switch and write matrix switch cores oppositely polarized with respect to the read-write cycle, each such matrix switch being shunted by a dummy load in series with a diode.

4. A magnetic core storage system according to claim 1, wherein said plurality of word conductor means (b) is for each word a single bipolar read-write winding.

5. A magnetic core storage system according to claim 1, wherein said plurality of word conductor means (b) is for each word a pair of windings connected respectively to said read selection means (d) and to said write selection means (e).

6. A magnetic core storage system according to claim 1, wherein read word selection means (d) and said write word selection means (e) each include a clamp diode connected between ground and the array side of each read and write gate matrix switch core secondary.

References Cited by the Examiner

UNITED STATES PATENTS

| | | | |
|---|---|---|---|
| 2,734,187 | 2/1956 | Rajchman | 340—174 |
| 2,914,748 | 11/1959 | Anderson | 340—174 |
| 2,914,754 | 11/1959 | Ganzhorn et al. | 340—174 |
| 2,933,719 | 4/1960 | Kelner et al. | 307—88 |
| 2,947,977 | 8/1960 | Bloch | 340—174 |
| 2,972,060 | 2/1961 | Torrey | 307—88 |
| 2,991,454 | 7/1961 | Hammer | 340—172.5 |
| 3,008,128 | 11/1961 | Powell | 340—174 |
| 3,041,582 | 6/1962 | Cray | 307—88 X |
| 3,126,528 | 3/1964 | Constantine | 340—174 |
| 3,129,336 | 4/1964 | Constantine | 307—88 |

IRVING L. SRAGOW, *Primary Examiner.*